(12) United States Patent
Serafin et al.

(10) Patent No.: US 11,741,720 B2
(45) Date of Patent: *Aug. 29, 2023

(54) SYSTEM AND METHOD FOR TRACKING OBJECTS USING USING EXPANDED BOUNDING BOX FACTORS

(71) Applicant: TOYOTA RESEARCH INSTITUTE, INC., Los Altos, CA (US)

(72) Inventors: Jacopo Serafin, Ann Arbor, MI (US); Matthew Derry, Ann Arbor, MI (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 3 days.

This patent is subject to a terminal disclaimer.

(21) Appl. No.: 17/523,694

(22) Filed: Nov. 10, 2021

(65) Prior Publication Data

US 2022/0067404 A1   Mar. 3, 2022

Related U.S. Application Data

(63) Continuation of application No. 16/653,694, filed on Oct. 15, 2019, now Pat. No. 11,200,434.

(51) Int. Cl.
    G06K 9/00      (2022.01)
    A61K 35/12     (2015.01)
    G06V 20/58     (2022.01)
    G06F 17/16     (2006.01)
    G06T 7/20      (2017.01)
    G06V 40/10     (2022.01)

(52) U.S. Cl.
    CPC ............ *G06V 20/58* (2022.01); *G06F 17/16* (2013.01); *G06T 7/20* (2013.01); *G06V 40/103* (2022.01); *G06T 2210/12* (2013.01)

(58) Field of Classification Search
    CPC .................................. G06K 9/00; A61K 35/12
    USPC ....... 382/100, 103, 106–107, 122, 104, 168, 382/157, 173, 181, 199, 206, 209, 219, 382/224, 254, 276, 286, 291, 305, 317; 340/995.17
    See application file for complete search history.

(56) References Cited

U.S. PATENT DOCUMENTS

| | | | | |
|---|---|---|---|---|
| 10,872,531 B2 * | 12/2020 | Liu | .................. | G06V 20/58 |
| 10,884,409 B2 * | 1/2021 | Mercep | ................. | G01S 13/862 |
| 11,200,434 B2 | 12/2021 | Serafin et al. | | |
| 2016/0004909 A1 * | 1/2016 | Mei | .................. | G06T 7/207 |
| | | | | 382/103 |
| 2016/0155024 A1 * | 6/2016 | Partis | .................... | G06V 20/35 |
| | | | | 382/173 |
| 2020/0160699 A1 * | 5/2020 | Annapureddy | .......... | G06T 7/70 |

(Continued)

*Primary Examiner* — Seyed H Azarian
(74) *Attorney, Agent, or Firm* — SEYFARTH SHAW LLP (57) ABSTRACT

Systems and methods of tracking objects around an ego vehicle, using state estimation of the objects, where state estimation may include an estimate of a position, velocity, acceleration and bounding box size of the tracked object are disclosed. An object may be detected at one or more poses over time. For each pose, a first bounding box may be generated. The largest bounding box may be determined. For each pose, the first bounding box may be expanded to an expanded bounding box. The expanded bounding box may match the largest bounding box. For each pose, the center of the expanded bounding box may be determined. The object may be tracked according to the center of the expanded bounding box.

16 Claims, 3 Drawing Sheets

(56) References Cited

U.S. PATENT DOCUMENTS

| | | | |
|---|---|---|---|
| 2021/0031760 A1* | 2/2021 | Ostafew | B60W 60/0017 |
| 2021/0042530 A1* | 2/2021 | Kim | G06F 18/214 |

* cited by examiner

SYSTEM AND METHOD FOR TRACKING OBJECTS USING USING EXPANDED BOUNDING BOX FACTORS

CROSS REFERENCE TO RELATE APPLICATIONS

The present application is a continuation of U.S. patent application Ser. No. 16/653,694, filed Oct. 15, 2019, the contents of which are hereby incorporated by reference in its entirety.

FIELD OF TECHNOLOGY

The present disclosure relates to a system and method of tracking objects around an ego vehicle, more specifically to a tracking system using state estimation, including estimated position, velocity, acceleration and bounding box size of the tracked object.

BACKGROUND

Autonomous and semi-autonomous vehicles rely on numerous on-board sensors to detect moving and stationary objects in the vehicles' environment to guide and control the vehicle's navigation. As the vehicle moves through the environment, and detected objects move, either on their own or in relation to the vehicle. The detection of those objects becomes a complex detection issue. Based on a vehicle sensor's point of view, the sensor's perception of an object within the sensor's environment may vary in terms of size, as portions of the object may be occluded from the sensor.

As such, a bounding box, drawn about the perceived object to represent the physical dimensions of the object, may vary as the sensor and object move relative to each other. The movement and occluded sensor detection lines make it difficult for the vehicle's sensors to determine an actual size of an object. It is also difficult to maintain a consistent bounding box as well as a consistent bounding box center for the object.

SUMMARY

Aspects of the present disclosure provide systems and methods of tracking objects around an ego vehicle, using state estimation of the objects, where state estimation may include an estimate of a position, velocity, acceleration and bounding box size of the tracked object. According to one aspect, a method of tracking an object is disclosed. An object may be detected at one or more poses over time. For each pose, a first bounding box may be generated. The largest bounding box may be determined. For each pose, the first bounding box may be expanded to an expanded bounding box. The expanded bounding box may match the largest bounding box. For each pose, the center of the expanded bounding box may be determined. The object may be tracked according to the center of the expanded bounding box.

According to another aspect of the present disclosure, a system for tracking an object is disclosed. The system may include at least one sensor configured to detect an object at one or more poses and a processor in communication with the at least one sensor. The processor may be configured to generating a first bounding box for each pose and determine the largest bounding box. For each pose, the first bounding box may be expanded to an expanded bounding box. The expanded bounding box may match the largest bounding box. For each pose, the center of the expanded bounding box may be determined. The object may be tracked according to the center of the expanded bounding box.

According to another aspect of the disclosure, a vehicle is disclose. The vehicle may include at least one sensor configured to detect one or more poses of an object and an object tracking module. The object tracking module may be configured to generating a first bounding box for each pose and determine the largest bounding box. For each pose, the first bounding box may be expanded to an expanded bounding box. The expanded bounding box matching the largest bounding box. For each pose, the center of the expanded bounding box may be determined. The object may be tracked according to the center of the expanded bounding box.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Figure 1A:
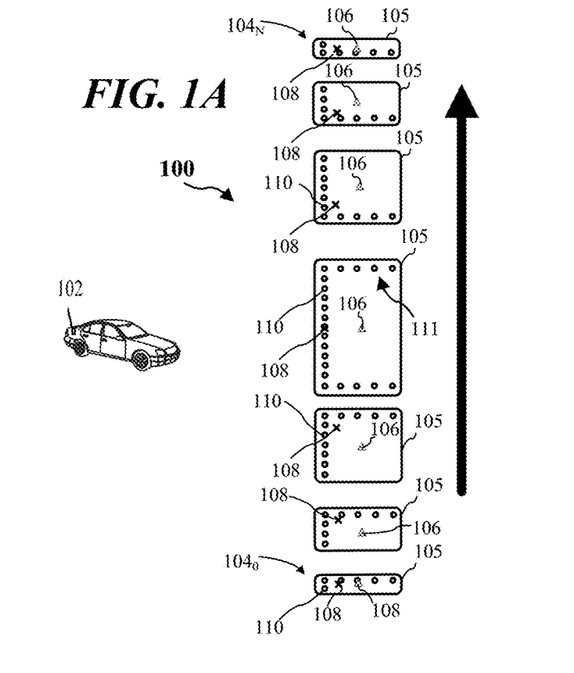
FIG. 1A depicts a conceptual diagram of an ego vehicle tracking an environmental object according to one aspect of the present disclosure.

The navigation of autonomous and semi-autonomous vehicles requires the accurate and efficient detection of surrounding objects in the vehicle's environment. Traditional detection methods may be inaccurate due to limitations in the vehicles sensors to perceive the three-dimensional size and shape of the surrounding objects. FIG. 1A depicts a conceptual diagram 100 of a traditional detection environment in which an ego vehicle 102 detects an object pose 104 as the object moves through the environment. The on-board sensors of the vehicle 102, as described further herein, may detect the object pose 104 within the ego vehicle's surrounding environment over a period. According to the exemplary diagram of FIG. 1A, the object pose 104 may be detected at one or more time intervals (shown as object poses $104_0$-$104_N$). The sensors may perceive the object pose 104 according to a number of detection points 110 forming a point cloud 111. Based on a vehicle sensor's point of view, the sensor's perception of an object pose 104 within the environment may vary in size, as portions of the object may be occluded from the sensor. The point clouds 111 may be used to define a bounding box 105 having a perceived center of mass or centroid 108 and a bounding box center 106. The bounding box 105 may be used to represent the size and shape of the object for tracking, collision avoidance, and the like. The centroid 108 may be estimated by averaging the points of the point cloud 111 belonging to the perceived object pose 104. The centroid 108 may be used as an anchor point to track the position of the object. The centroid 108, however, may not be an ideal anchor point due the fact that the centroid 108 may shift significantly as the point of view with respect to the object pose 104 changes over time. Ideally, an anchor point should be a fixed point relative to the true shape of the object being tracked.

Traditional tracking systems may track an object according to the object's centroid 108. The sensors of the ego vehicle 102 may have limited perception of an object pose 104, however and may cause the bounding box 105 to also vary in size as the object moves relative to the ego vehicle 102, or vice versa. The ego vehicle 102 may not be able to determine the actual size of the object or define an accurate bounding box 105, or bounding box center 106. As such, detection of and navigation through such objects may be hindered.

Filtering approaches may attempt to estimate the most recent state of a tracked object by integrating the most recent observations or measurements associated to the object. Differently from filtering, smoothing approaches may attempt to estimate the states of the full (or partial) history of a tracked object, not only the most recent state, given all the observations seen so far. As such, smoothing approaches may adapt as new information is gathered and change the past states estimates according to that new information. One method used to perform smoothing state estimation, according to one aspect of the disclosure, is the use of factor graphs.

Figure 1B:
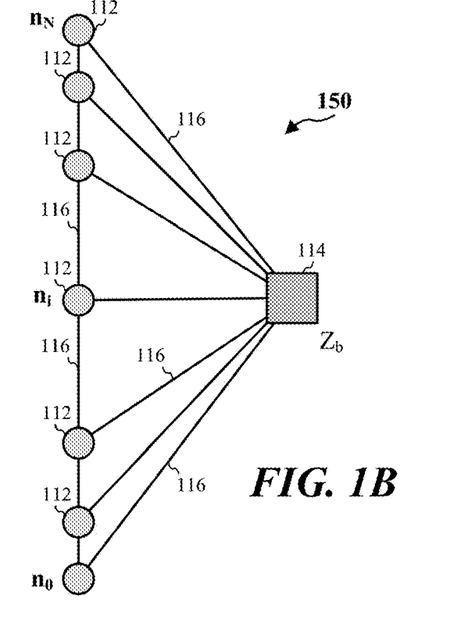
FIG. 1B depicts a factor graph representing the object tracking environment of FIG. 1A according to one aspect of the present disclosure.

FIG. 1B depicts an exemplary factor graph 150 representing the object tracking environment of FIG. 1A. Factor graphs may be composed by at least one factor 114 with one or more edges 116 representing to which and how many pose nodes 112 the factor 114 connects. The factor 114 may set a constraint among the pose nodes 112. The pose nodes 112 include the variables we want to estimate while the edges 116 represent constraints between pose nodes 112 arising from sensor observations. A pose node 112 may represent a single track state of a tracked object in its history (which in general is composed of many states, e.g. $n_0$-$n_N$). The pose node 112 may include, according to one aspect, at least information regarding the anchor point (centroid), the heading and the bounding box estimate for the tracked object. In general, however, the state information may include additional data or observations such as velocity, acceleration, and the like. In the exemplary factor graph 150 of FIG. 1B, the factor $Z_b$ 114 may be a constraint that connects to all historical pose nodes 112 of a tracked object. The factor $Z_b$ 114 may be intended to pull the anchor point toward the center of a "real" bounding box of the object. The "real" bounding box may be an object descriptor that does not shift with respect to the object's shape and is not affected by the point-of-view changes of the vehicle or object). According to one aspect, the constraint $Z_b$ 114 may be generated by taking the maximum bounding box found over the all pose 112 nodes of the tracked history of an object. The constraint $Z_b$ 114 may be used to expand the bounding box estimate at each pose node 112.

Figure 2:
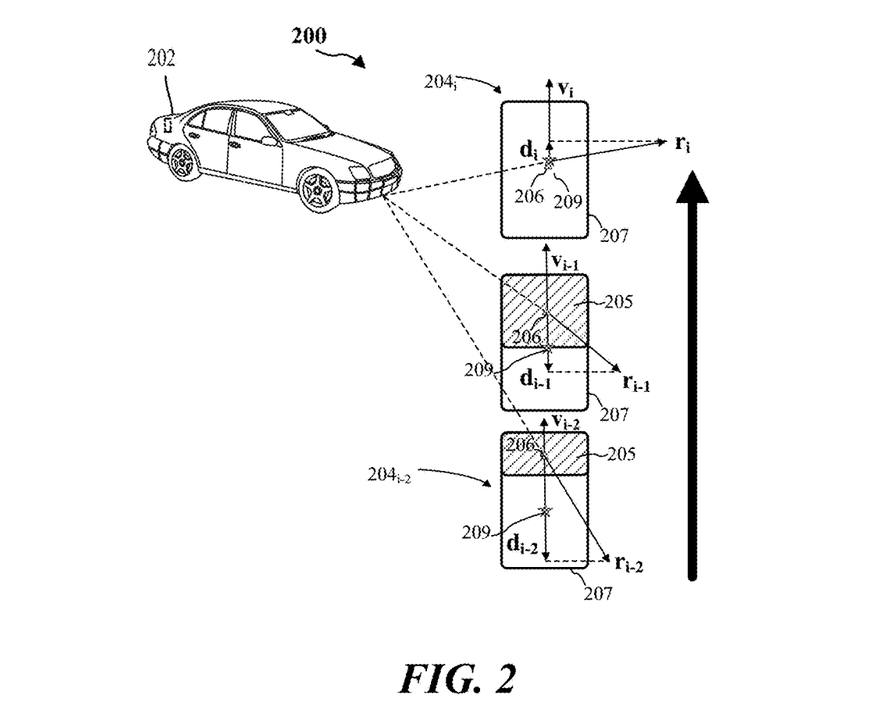
FIG. 2 depicts a conceptual diagram of the determination of a maximum bounding box according to an aspect of the present disclosure.

FIG. 2 depicts a conceptual diagram 200 of the determination of a maximum bounding box according to an aspect of the present disclosure. An ego vehicle 202 may detect and track an object pose 204 over a period (denoted as elements $204_{i-2}$-$204_i$). Each object pose 204 may include a first bounding box 205 and respective first centroid 206. An expanded bounding box 207, having an estimated anchor point or centroid 209, may be calculated for each object pose 204. The expanded bounding box 207 may represent the largest bounding box calculated from the point cloud data obtained by the ego vehicle's 202 sensors. As depicted in FIG. 2, the bounding box 207 at object pose $204_i$ represents the largest bounding box (i.e., the expanded bounding box 207 and the first bounding box 205 may be the same).

According to one aspect, the first bounding boxes 205 may be expanded in an appropriate direction, 'd', in order to capture accurately the object pose 204. There may be, however, ambiguity in which direction to expand a bounding box due to the symmetric nature of the rectangular shape of the bounding box. To resolve the ambiguity, an object heading vector 'V' and a radial direction 'r' from the ego vehicle 202 to the tracked object pose 204 may be used to expand the first bounding box 205 for each object pose 204. The object heading vector 'V' may denote the direction the object is moving, relative to the ego vehicle 202. Alternatively, a linear velocity estimate direction could be used instead of the object heading vector. The radial direction vector 'r' may be a vector between the vehicle sensor and the center of the first bounding box of the detected object. The radial direction vector may rely on the assumption that from the ego vehicle 202 point-of-view, only the first-seen surface of an object is detected, as the remaining portion of the object may be occluded by the object itself.

According to one aspect, the expansion direction, d, of the expanded bounding box 207 is computed as a normalized vector dot product between the object heading vector 'V' and the radial direction 'r'. The normalized vector dot product (d=|r·v|), which corresponds to the projection vector of r on v. The factor $Z_b$ (not shown) will then set a constraint to pull the estimated centroid 209 toward the center of the expanded bounding box for each object pose 204. The factor $Z_b$ may be also used to constrain the size of the bounding box in each object pose 204 to be about the same size as the expanded bounding box observed in the past tracked history.

Figure 3:
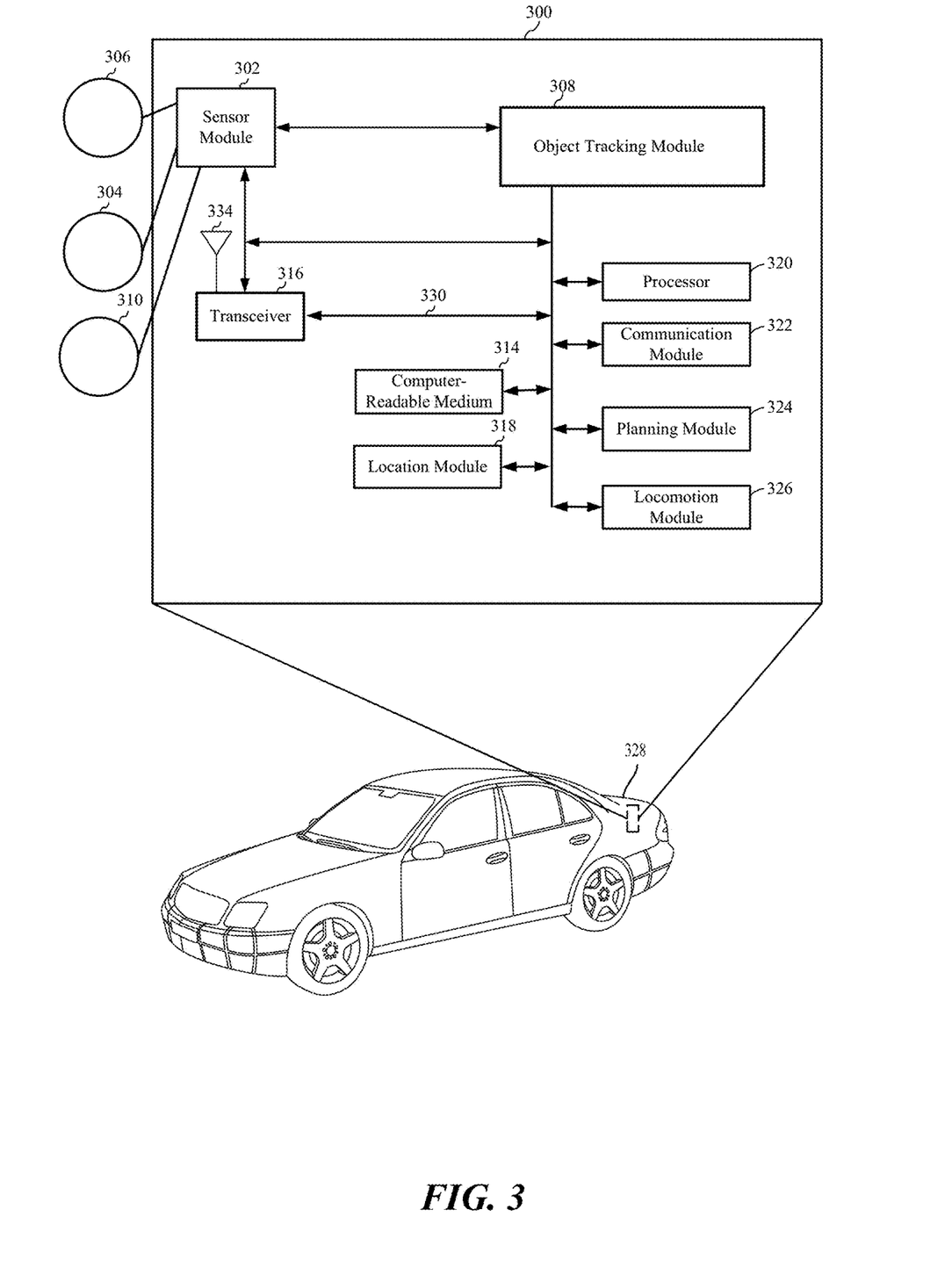
FIG. 3 depicts a hardware implementation for an object tracking system according to aspects of the present disclosure.

FIG. 3 is a diagram illustrating an example of a hardware implementation for an object tracking system 300, according to aspects of the present disclosure. The object tracking system 300 may be a component of a vehicle, a robotic device, or other device. For example, as shown in FIG. 3, the object tracking system 300 may be a component of a car 328. Aspects of the present disclosure are not limited to the object tracking system 300 being a component of the car 328, as other devices, such as a bus, boat, drone, simulator, or robot, are also contemplated for using the object tracking system 300. The car 328 may be autonomous or semi-autonomous.

The object tracking system 300 may be implemented with a bus architecture, represented generally by a bus 330. The bus 330 may include any number of interconnecting buses and bridges depending on the specific application of the object tracking system 300 and the overall design constraints. The bus 330 may link together various circuits including one or more processors and/or hardware modules, represented by a processor 320, a communication module 322, a location module 318, a sensor module 302, a locomotion module 326, a planning module 324, and a computer-readable medium 314. The bus 330 may also link various other circuits such as timing sources, peripherals, voltage regulators, and power management circuits, which are well known in the art, and therefore, will not be described any further.

The object tracking system 300 may include a transceiver 316 coupled to the processor 320, the sensor module 302, an object tracking module 308, the communication module 322, the location module 318, the locomotion module 326, the planning module 324, and the computer-readable medium 314. The transceiver 316 is coupled to an antenna 334. The transceiver 316 communicates with various other devices over a transmission medium. For example, the transceiver 316 may receive commands via transmissions from a user or a remote device. As another example, the transceiver 316 may transmit driving statistics and information from the object tracking module 308 to a server (not shown).

The object tracking module 308 may include the processor 320 coupled to the computer-readable medium 314. The processor 320 may perform processing, including the execution of software stored on the computer-readable medium 314 providing functionality according to the disclosure. The software, when executed by the processor 320, causes the object tracking system 300 to perform the various functions described for a particular device, such as the car 328, or any of the modules 302, 308, 314, 316, 318, 320, 322, 324, 326. The computer-readable medium 314 may also be used for storing data that is manipulated by the processor 320 when executing the software.

The sensor module 302 may be used to obtain measurements via different sensors, such as a first sensor 306, a second sensor 304, and a third sensor 310. The first sensor 306 may be a vision sensor, such as a stereoscopic camera or a red-green-blue (RGB) camera, for capturing 2D images. The second sensor 304 may be a ranging sensor, such as a light detection and ranging (LIDAR) sensor or a radio detection and ranging (RADAR) sensor. The third sensor 310 may include an in-cabin camera for capturing raw video or images of the interior environment of the car 328. Of course, aspects of the present disclosure are not limited to the aforementioned sensors as other types of sensors, such as, for example, thermal, sonar, and/or lasers are also contemplated for either of the sensors 304, 306. The measurements of the sensors 304, 306, 310, 306 may be processed by one or more of the processor 320, the sensor module 302, the object tracking module 308, the communication module 322, the location module 318, the locomotion module 326, the planning module 324, in conjunction with the computer-readable medium 314 to implement the functionality described herein. In one configuration, the data captured by the first sensor 306 and the second sensor 304 may be transmitted to an external device via the transceiver 316. The sensors 304, 306, 310 may be coupled to the car 328 or may be in communication with the car 328.

The location module 318 may be used to determine a location of the car 328. For example, the location module 318 may use a global positioning system (GPS) to determine the location of the car 328. The communication module 322 may be used to facilitate communications via the transceiver 316. For example, the communication module 322 may be configured to provide communication capabilities via different wireless protocols, such as WiFi, long term evolution (LTE), 3G, etc. The communication module 322 may also be used to communicate with other components of the car 328 that are not modules of the object tracking module 308.

The locomotion module 326 may be used to facilitate locomotion of the car 328. As an example, the locomotion module 326 may control movement of the wheels. As another example, the locomotion module 326 may be in communication with a power source of the car 328, such as an engine or batteries. Of course, aspects of the present disclosure are not limited to providing locomotion via wheels and are contemplated for other types of components for providing locomotion, such as propellers, treads, fins, and/or jet engines.

The object tracking system 300 may also include the planning module 324 for planning a predicted route or trajectory or controlling the locomotion of the car 328, via the locomotion module 326. In one configuration, the planning module 324 overrides the user input when the user input is expected (e.g., predicted) to cause a collision. The modules may be software modules running in the processor 320, resident/stored in the computer-readable medium 314, one or more hardware modules coupled to the processor 320, or some combination thereof.

The object tracking module 308 may be in communication with the sensor module 302, the transceiver 316, the processor 320, the communication module 322, the location module 318, the locomotion module 326, the planning module 324, and the computer-readable medium 314. In one configuration, the object tracking module 308 may receive sensor data from the sensor module 302. The sensor module 302 may receive the sensor data from the sensors 304, 306, 310. According to aspects of the disclosure, the sensor module 302 may filter the data to remove noise, encode the data, decode the data, merge the data, extract frames, or perform other functions. In an alternate configuration, the map generator 308 may receive sensor data directly from the sensors 304, 306, 310.

As shown in FIG. 3, the object tracking module 308 may be in communication with the planning module 324 and the locomotion module 326 to detect, analyze, circumnavigate, and operate the car 328 according to the perceived objects and surrounding environment. As described herein, the object tracking module 308 may analyze the data from the sensor module 302 and others to determine and detect environmental objects, determine bounding boxes for the detected objects, and track the objects, as described herein. The car 328 may navigate through the environment according to the perceived objects, their relative size and movement.

As described herein, the object tracking module 308 may receive sensor data from the sensor module 302 relating to one or more objects perceived or identified in the environment. The object tracking module 308 may generate a factor graph for a detected object. The factor graph may include one or more poses over time representing the state of the object at given intervals. The object tracking module 308 may generate a first bounding box for each pose. The first bounding box may be determined by a number of detection points in a point cloud, as observed by the sensors 304, 306, 310. The object tracking module 308 may determine a relative center of the first bounding box for each pose. The object tracking module 308 may determine the largest bounding box among the first bounding boxes of each pose.

For each pose, the first bounding box may be expanded to form an expanded bounding box matching the size of the largest bounding box calculated. The first bounding boxes may be expanded in a direction given by the travel direction of the object and a radial direction from the car 328. The object tracking module 308 may determine the relative center of each expanded bounding box. The object tracking module may track the object using the relative center of the expanded bounding boxes and not the centroid of the object pose, as determined by a point cloud detected by the car 328.

Figure 4:
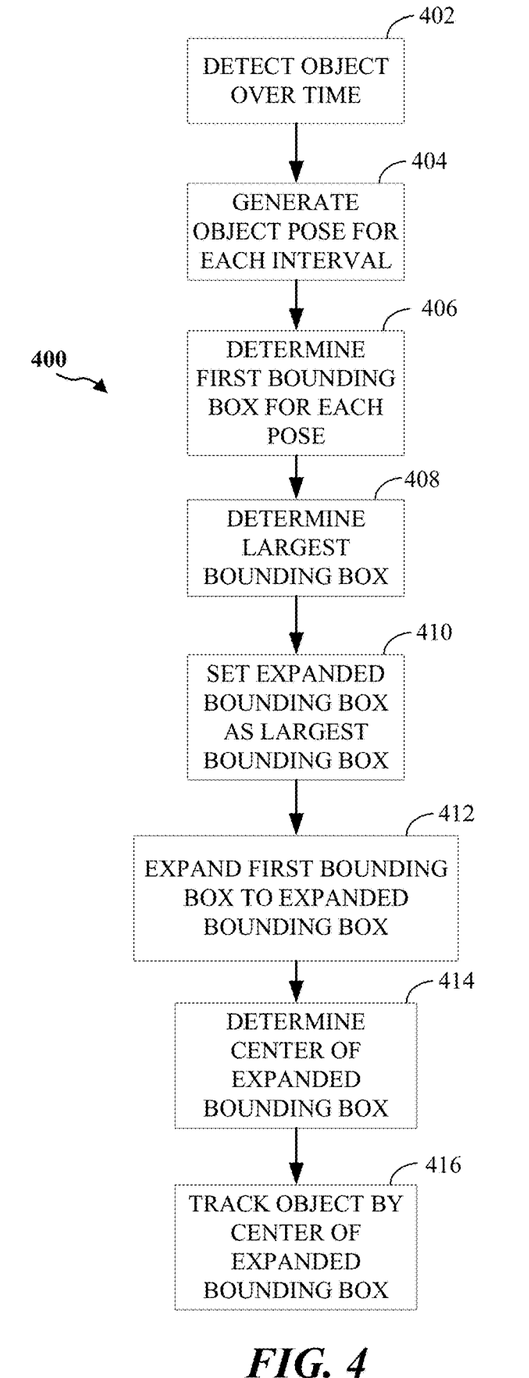
FIG. 4 depicts a method of tracking an object according to one aspect of the present disclosure.

Turning now to FIG. 4, a method 400 of tracking an object by an ego vehicle is depicted. As shown in block 402, an object may be detected in a vehicle's environment by one or more system sensors. The object may be detected over time intervals as the object moves or changes position with respect to the vehicle. As shown in block 404 an object pose may be generated for the object at each interval. The object pose, as described herein, may include various state information regarding the objects size, shape, motion, or the like. As shown in block 406, a first bounding box may be determined from the state information for each object pose. The first bounding box may be defined by a detection point cloud as detected by the vehicle sensors.

As shown in block 408, the largest bounding box may be determined from the first bounding boxes for each pose. An expanded bounding box may be set to match the size of the largest bounding box, as shown in block 410. As shown in block 412, the first bounding box for each pose may be expanded to match that of the expanded bounding box. The first bounding box may be expanded, as described herein, by calculating the dot product of the object pose's heading vector (or linear velocity) and a radial direction vector. As shown in block 414, the center of the expanded bounding box may be determined for each object pose. The object, as shown in block 416, may be tracked according to the center of expanded bounding box. The center of the expanded bounding box may provide an anchor point for the vehicle's tracking system to provide more accurate and stable tracking.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of tracking moving and stationary objects in a vehicle's environment, the method comprising:
   detecting an object at one or more poses over time;
   for each pose, generating a first bounding box;
   determining a largest bounding box;
   for each pose, expanding the first bounding box according to a radial direction vector to an expanded bounding box, the radial direction vector denoting a radial vector between a detecting vehicle and a center of the first bounding box of the object, the expanded bounding box matching the largest bounding box;
   for each pose, determining the center of the expanded bounding box;
   tracking the object according to the center of the expanded bounding box.

2. The method of claim 1 wherein the one or more poses includes object state data.

3. The method of claim 2 wherein the object state data includes at least one of a velocity, an acceleration, a direction, a point cloud, a centroid, and a first bounding box center.

4. The method of claim 1 wherein, for each node, the first bounding box is expanded in a first direction.

5. The method of claim 4 wherein the first direction is a projection of the radial direction vector on a object heading vector.

6. The method of claim 5 wherein the object heading vector includes a movement direction of the object.

7. The method of claim 1 wherein the first bounding box is determined by a point cloud detected by a vehicle sensor.

8. The method of claim 1 wherein the one of more poses comprise a feature graph, each pose comprising a node of the feature graph.

9. A system for tracking an object comprising:
at least one sensor configured to detect an object at one or more poses;
a processor in communication with the at least one sensor, the processor configured to:
for each pose, generating a first bounding box;
determine the largest bounding box;
for each pose, expand the first bounding box in a first direction to an expanded bounding box, the first direction being a projection of radial direction vector on an object heading vector, denotes a radial vector between a detecting vehicle and a center of the first bounding box of the object, the expanded bounding box matching the largest bounding box;
for each pose, determine the center of the expanded bounding box;
track the object according to the center of the expanded bounding box.

10. The method of claim 9 wherein the one or more poses includes object state data.

11. The method of claim 10 wherein the object state data includes at least one of a velocity, an acceleration, a direction, a point cloud, a centroid, and a first bounding box center.

12. The method of claim 9 wherein the object heading vector includes a movement direction of the object.

13. The method of claim 9 wherein the first bounding box is determined by a point cloud detected by a vehicle sensor.

14. The method of claim 9 wherein the one or more poses comprise a feature graph, each pose comprising a node of the feature graph.

15. A vehicle comprising:
at least one sensor configured to detect one or more poses of an object;
an object tracking module configured to:
for each pose, generating a first bounding box;
determine the largest bounding box;
for each pose, expanding the first bounding box according to a radial direction vector to an expanded bounding box, the radial direction vector denoting a radial vector between a detecting vehicle and a center of the first bounding box of the object the expanded bounding box matching the largest bounding box;
wherein, for each pose, the first bounding box is expanded in a first direction defined by a dot product of the radial direction vector and an object heading vector;
for each pose, determine the center of the expanded bounding box;
track the object according to the center of the expanded bounding box.

16. The vehicle of claim 15 wherein the one or more poses comprise a feature graph, each pose comprising a node of the feature graph.

* * * * *

UNITED STATES PATENT AND TRADEMARK OFFICE
CERTIFICATE OF CORRECTION

| | | |
|---|---|---|
| PATENT NO. | : 11,741,720 B2 | Page 1 of 1 |
| APPLICATION NO. | : 17/523694 | |
| DATED | : August 29, 2023 | |
| INVENTOR(S) | : Jacopo Serafin and Matthew Derry | |

It is certified that error appears in the above-identified patent and that said Letters Patent is hereby corrected as shown below:

On the Title Page

Item [54], and in the Specification Column 1 Line 1 Please replace Title "SYSTEM AND METHOD FOR TRACKING OBJECTS USING USING EXPANDED BOUNDING BOX FACTORS" with --"SYSTEM AND METHOD FOR TRACKING OBJECTS USING EXPANDED BOUNDING BOX FACTORS"--

Signed and Sealed this
Twenty-eighth Day of October, 2025

John A. Squires
*Director of the United States Patent and Trademark Office*